US005293161A

United States Patent [19]

MacDonald et al.

[11] Patent Number: 5,293,161

[45] Date of Patent: Mar. 8, 1994

[54] SELECTIVE CALL RECEIVER HAVING A VARIABLE FREQUENCY VIBRATOR

[75] Inventors: John F. MacDonald, Coral Springs; Jeffrey S. King, Boynton Beach, both of Fla.

[73] Assignee: Motorola, Inc., Schaumburg, Ill.

[21] Appl. No.: 895,226

[22] Filed: Jun. 8, 1992

Related U.S. Application Data

[63] Continuation of Ser. No. 539,404, Jun. 18, 1990, abandoned.

[51] Int. Cl.⁵ ............ H04Q 7/00

[52] U.S. Cl. ............ 340/825.46; 340/825.44

[58] Field of Search ............ 340/825.44, 825.47, 340/825.48, 825.46, 311.1, 825.56; 368/245

[56] References Cited

U.S. PATENT DOCUMENTS

| | | | |
|---|---|---|---|
| 3,623,064 | 11/1971 | Kagan | 340/825.46 |
| 4,233,679 | 11/1980 | Schwarzschild | 368/245 |
| 4,352,091 | 9/1982 | Yamasaki | 340/825.44 |
| 4,576,484 | 3/1986 | Grossmeyer | 368/245 |
| 4,731,603 | 3/1988 | McRae et al. | 340/825.46 |
| 4,755,816 | 7/1988 | DeLuca | 340/825.44 |
| 4,786,902 | 11/1988 | Davis et al. | 340/825.56 |
| 4,868,561 | 9/1989 | Davis | 340/825.44 |
| 4,962,545 | 10/1990 | Klaczak et al. | 340/825.44 |
| 5,172,092 | 12/1992 | Nguyen et al. | 340/825.44 |

FOREIGN PATENT DOCUMENTS

| | | | |
|---|---|---|---|
| 1-227535 | 9/1989 | Japan | 340/825.44 |

*Primary Examiner*—Donald J. Yusko
*Assistant Examiner*—John Giust
*Attorney, Agent, or Firm*—Keith A. Chanroo; Thomas G. Berry; Daniel R. Collopy

[57] ABSTRACT

A selective call receiver (100) comprises a receiver (104) for receiving a message and a vibrator (116) capable of vibrating at a selected one of at least two selectable frequencies for alerting a user of a received message. The vibrator (116) also has a selector (120) or a tuning element (130) for varying the frequency of the vibrator (116).

20 Claims, 2 Drawing Sheets

SELECTIVE CALL RECEIVER HAVING A VARIABLE FREQUENCY VIBRATOR

This is a continuation of application Ser. No. 07/539,404, filed Jun. 18, 1990 now abandoned.

FIELD OF THE INVENTION

This invention relates in general to selective call receivers having a tactile alert, and more specifically to selective call receiver having a variable frequency vibrator.

BACKGROUND OF THE INVENTION

Electronic devices such as selective call receivers have different methods of alerting a user that a message has been received. One such method of alert is a tactile alert (e.g., vibrational alert), which is conveniently used in business meetings, libraries, and other places where it may be inappropriate to use an audio alert. However, in conventional selective call receivers, the frequency of the vibrator device is usually fixed at some pre-determined frequency. Although the frequency of vibration is fixed, a large variation in the frequency results from the manufacturing process. This causes some users, however, to consider the vibratory mode to be either too high or too low, and as a consequence, a number of these users may avoid using the vibratory alert mode.

Regrettably, however, a selective call receiver having a variable frequency tactile alert has been heretofore unavailable, thus failing to satisfy the varied needs of different users of selective call receivers. Accordingly, a need exits for a tactile alert having a variable frequency of vibration.

SUMMARY OF THE INVENTION

Briefly, according to the invention, a electronic device comprises a receiver for receiving a message and having a vibrator alert capable of vibrating at a selected one of at least two frequencies. The vibrator also has a selector capability for varying the frequency of the vibrator.

DESCRIPTION OF A PREFERRED EMBODIMENT

Figure 1:
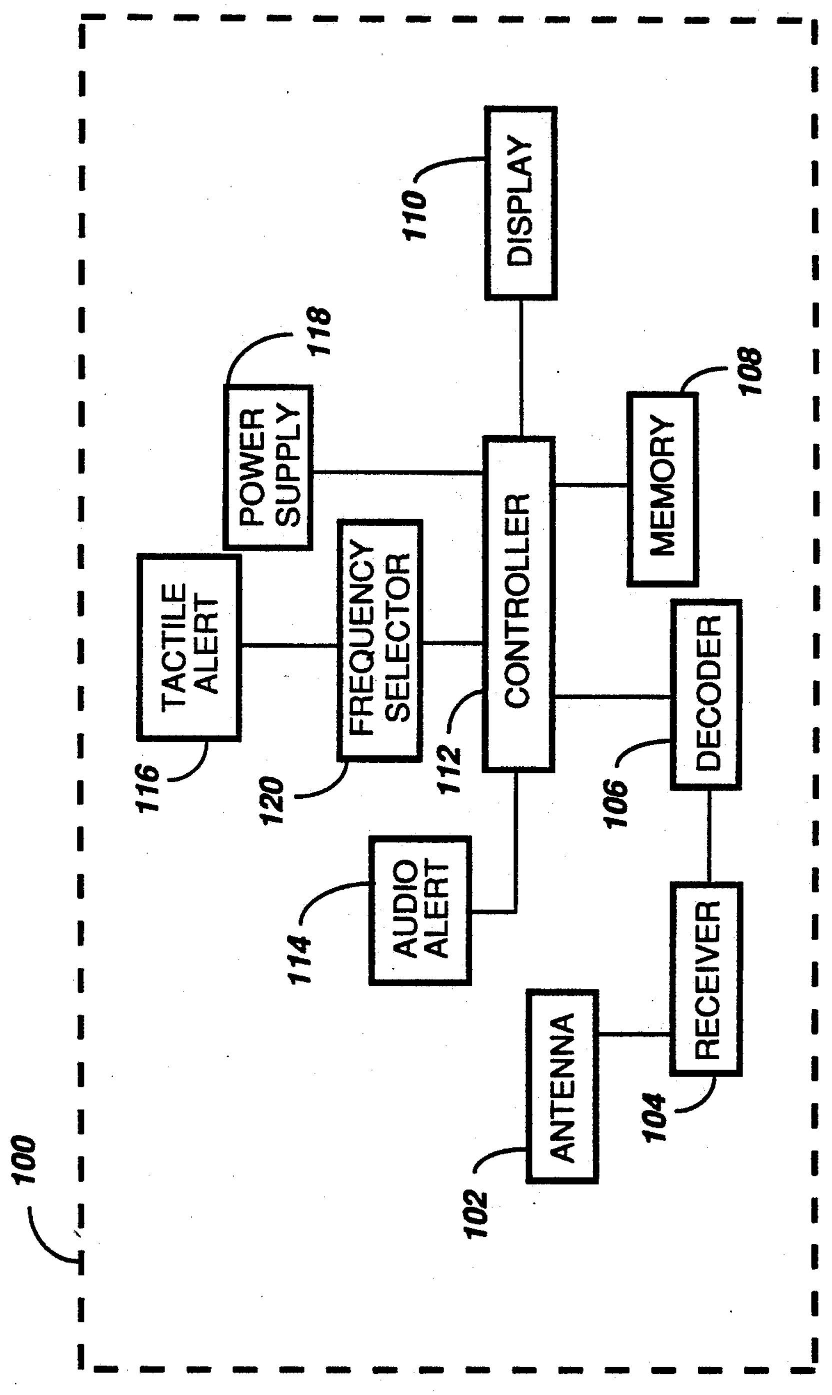
FIG. 1 is a block diagram of a selective call receiver in accordance with a first embodiment of the present invention.

Referring to FIG. 1, a selective call radio receiver 100 (e.g., a pager) comprises an antenna 102 that provides an RF carrier signal that is mixed with a local oscillator signal contained within the receiver module 104. The receiver module 104 generates a recovered signal suitable for processing by a decoder 106 in a manner well known to those skilled in the art. The decoder 106 converts the signal to an address. A controller 112 compares the decoded address with one or more predetermined addresses contained in the memory 108. When the addresses are substantially similar, the user is altered that a signal has been received by either by an audio alert (e.g., speaker) 114 or a tactile alert (e.g., vibrator) 116.

According to the invention, the frequency of the tactile alert 116 can be varied by varying a frequency selector 120. In this way another vibrating frequency of the tactile alter 116 may be selected.

In one embodiment, the frequency selector 120 comprises a microcomputer (the controller 112) programmed via conventional techniques to measure a parameter (e.g., the actual vibration, such as, the amplitude of vibration, or the electromagnetic force) of the tactile alert (vibrator alert) 116. Optionally, the microcomputer comprising the frequency selector 120 may monitor a signal, such as, the current or the voltage of the power supply 118, or the electromagnetic force of the tactile alert 116. This information is then used to keep the vibration of the tactile alter 116 substantially constant or at the desired frequency setting. According to the invention, a selected frequency of vibration is held substantially constant, for example, by the microcomputer of the controller 112, which monitors the current applied to vibrator from the power supply 118. As the battery power decreases (such as by aging) to the point where there is insufficient current to maintain the present frequency of vibration, the microcomputer will select another frequency of vibration such as by comparing the current used to a threshold stored in the memory 108. Other methods of choosing alternate frequencies of vibration may be, for example, according to the voltage supplied from the power supply 118 or the amplitude of vibration of the tactile alert 116. The electronic device capable of being powered by the power source providing an output that varies over a voltage range, and the controller providing a constant signal to the vibrator over the voltage range.

Figure 2:
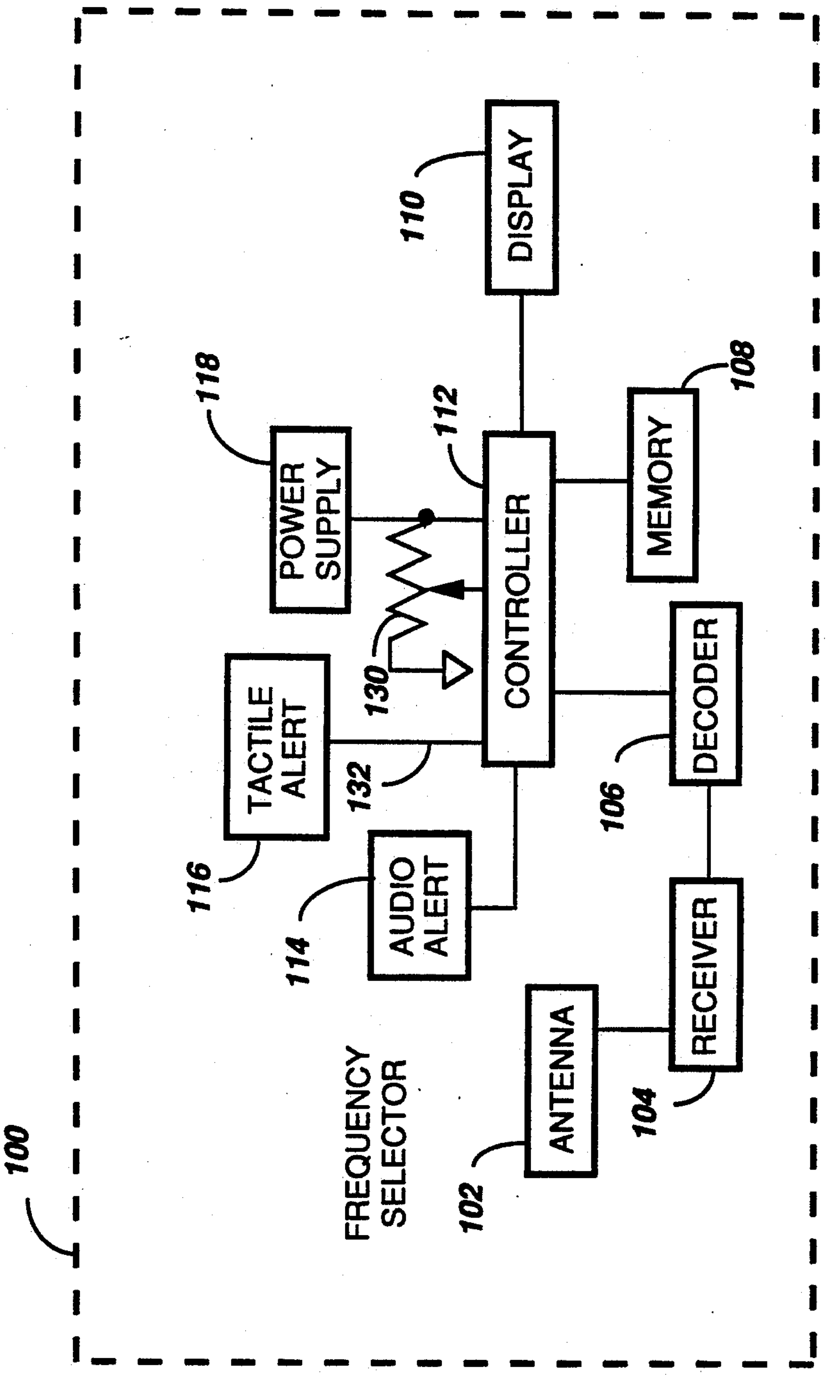
FIG. 2 is a block diagram of a selective call receiver in accordance with a second embodiment of the present invention.

FIG. 2 shows a selective call receiver 100 similar to FIG. 1 and comprising a second embodiment for varying the frequency of the tactile alert 116. In this embodiment, the selective call receiver 100 includes a tuning hole on a housing (not shown) to permit tuning a tuning element 130 (e.g. a tunable resistor) that is monitored by the controller 112. The controller is responsive to the voltage monitored to vary the drive signal 132 to the tactile alert 116. The tuning hole may be located in any suitable location on the selective call receiver, such as, under a removable conventional belt clip, under the battery door on the housing, within a code plug programming slot, under a housing lock opening, or under labels etc. on the selective call receiver 100.

Accordingly, varying the current or voltage using known techniques may also be used to vary the frequency of the tactile alert 116, which in another aspect of the invention may be measured using one of the several known techniques, such as, frequency counters or pressure sensor feedback systems that are commercially available from manufactures such as TDK or Murata. After measuring the vibration of the tactile alert 116, information relating to the selected frequency may be displayed on the display 110 of the selective call receiver 100.

In summary, a variable frequency vibrator allows the user to preset a desired frequency of vibration. The present frequency is held constant by a microcomputer or the like the over an active range of the power supply, and after further discharge of the power supply 118 (e.g., below the active range), the microcomputer will measure a parameter from the power supply 118 or the tactile alter 116 to select the next suitable frequency of vibration. Additionally, the selective call receiver 100 may display the selected frequency of vibration setting on the display 110.

We claim:

1. An electronic device powered by a battery, comprising:

a receiver for receiving a message;

a vibrator capable of vibrating at a selected one of at least two frequencies for alerting a user of the received message;

selector means for enabling a user selectable frequency of vibration of said vibrator which optimizes the user's response to the vibrator; and controller for monitoring a characteristic of said vibrator and for adjusting a parameter of said vibrator in response to the monitored characteristic for maintaining a constant rate of vibration of the selected frequency of vibration of said vibrator.

2. The electronic device according to claim 1 wherein the selector means comprises tunable means for adjusting the signal applied to the vibrator.

3. The electronic device according to claim 1 wherein the monitoring means monitors a characteristic of the vibrator.

4. The electronic device according to claim 3 wherein the characteristic comprises the frequency of the vibration of said vibrator.

5. The electronic device according to claim 3 wherein the characteristic comprises an amplitude of the vibration of said vibrator.

6. The electronic device according to claim 3 wherein the characteristic comprises an electromagnetic force emitted from the vibrator.

7. The electronic device according to claim 1 wherein the characteristic comprises a current for driving the vibrator.

8. The electronic device according to claim 1 wherein the characteristic comprises a voltage for powering the vibrator.

9. The electronic device according to claim 1 wherein the selector means comprises a display means for displaying information relating to a selected frequency.

10. The electronic device according to claim 1 wherein the battery provides a voltage output that may vary over a voltage range, and the controller providing a constant signal to the vibrator over the voltage range.

11. The electronic device according to claim 1 wherein the selector means for adjusting the signal applied to the vibrator comprises a micro-computer.

12. The electronic device according to claim 1 wherein the controller further controls the selector means in response to the monitored characteristic of said vibrator for determining when to select another frequency of vibration, said selector means for automatically selecting another frequency in response to said controller.

13. A selective call receiver powered by a battery, comprising:

a receiver for receiving messages;

a vibrator capable of vibrating on at least two frequencies of vibration for alerting a user of the selective call receiver of the reception of a message on one of the at least two frequencies of vibration;

selector means for enabling a user selectable frequency of vibration of said vibrator which optimizes the user's response to the vibrator; and controller means for monitoring a characteristic of said vibrator and for adjusting a parameter of said vibrator in response to the monitored characteristic of said vibrator for maintaining a constant rate of vibration on the selected frequency of vibration, said controller means further controls said selector means in response to the monitored characteristic for determining when to select the other frequency of vibration, said selector means capable of automatically selecting the other frequency in response to said controller means.

14. The selective call receiver according to claim 13 wherein the controller means is coupled between a tunable element and the vibrator for controlling a signal supplied to the vibrator in response to the monitoring means.

15. In an electronic device for providing a tactile alert of a received message to a user of the electronic device, a method comprising the step of:

(a) selecting a frequency of vibration of a tactile alerting device capable of vibrating on at least two frequencies whereby the selected frequency optimizes a user's response to said tactile alerting device;

(b) monitoring a characteristic of the tactile alerting device;

(c) adjusting the frequency selected in response to step (b) for maintaining a constant frequency of vibration; and (d) automatically selecting another frequency of vibration in response to step (c) when the adjusting step cannot maintain the constant frequency of vibration.

16. The method according to claim 15 wherein the monitoring step comprises monitoring a voltage for powering the tactile alert.

17. The method according to claim 15 wherein the monitoring step comprises monitoring a current for driving the tactile alert.

18. The method according to claim 15 wherein the monitoring step comprises monitoring an amplitude of vibration of the tactile alert.

19. The method according to claim 15 wherein the monitoring step comprises monitoring an electromagnetic force emitted from the tactile alert.

20. An electronic device powered by a battery, comprising:

a receiver for receiving a message;

a vibrator capable of vibrating at a selected one of at least two frequencies for alerting a user of the received message;

selector means for enabling a user selectable frequency of vibration of said vibrator which optimizes the user's response to the vibrator; and controller for monitoring a characteristic of said vibrator and for adjusting a parameter of said vibrator in response to the monitored characteristic for maintaining a constant rate of vibration of the selected frequency of vibration of said vibrator, said controller further controls the selector means in response to the monitored characteristic of said vibrator for determining when to select another frequency of vibration, said selector means capable of automatically selecting another frequency in response to said controller.

* * * * *